United States Patent
Hara et al.

(10) Patent No.: US 8,158,248 B2
(45) Date of Patent: Apr. 17, 2012

(54) POROUS CERAMIC FOR SLIDE MEMBER, METHOD FOR PREPARING THE SAME, AND MECHANICAL SEAL RING

(75) Inventors: Takeshi Hara, Higashiomi (JP); Shinichiro Masuyama, Kirishima (JP)

(73) Assignee: Kyocera Corporation, Kyoto (JP)

( * ) Notice: Subject to any disclaimer, the term of this patent is extended or adjusted under 35 U.S.C. 154(b) by 771 days.

(21) Appl. No.: 11/912,286

(22) PCT Filed: Dec. 22, 2005

(86) PCT No.: PCT/JP2005/023593
§ 371 (c)(1),
(2), (4) Date: Dec. 9, 2008

(87) PCT Pub. No.: WO2006/117897
PCT Pub. Date: Nov. 9, 2006

(65) Prior Publication Data
US 2009/0214850 A1 Aug. 27, 2009

(30) Foreign Application Priority Data
Apr. 27, 2005 (JP) ................................. 2005-129165

(51) Int. Cl.
*B32B 3/26* (2006.01)
*B29C 67/20* (2006.01)
(52) U.S. Cl. ............... 428/314.2; 428/307.3; 428/307.7; 428/312.6; 428/312.8; 428/315.5; 428/315.7; 264/49; 264/42; 264/43; 264/46.4; 264/46.6
(58) Field of Classification Search ........................ None
See application file for complete search history.

(56) References Cited

U.S. PATENT DOCUMENTS

| 5,080,378 A | 1/1992 | Kagawa |
| 5,395,807 A | 3/1995 | Divakar et al. ................... 501/88 |
| 5,610,110 A | 3/1997 | Azema et al. |
| 5,707,065 A | 1/1998 | Azema et al. |
| 2005/0250640 A1 | 11/2005 | Meier et al. |

FOREIGN PATENT DOCUMENTS

| EP | 0486336 A1 | 5/1992 |
| EP | 0578408 A2 | 1/1994 |

(Continued)

OTHER PUBLICATIONS

Extended European search report dated Feb. 2, 2011 for corresponding European application 05819464.8.

(Continued)

*Primary Examiner* — Ling Xu
(74) *Attorney, Agent, or Firm* — DLA Piper LLP (US)

(57) ABSTRACT

In porous ceramic for slide member including independent pores having a pore size of 5 μm or more, the independent pore is flattened body having minor axis in a direction perpendicular to a sliding surface, and a cross sectional area (S1) of an independent pore at a cross section perpendicular to the sliding surface is 95% or less of an area (S2) of a complete round having a diameter which is the same length as a major axis of the cross section of the independent pore, and in a cumulative distribution curve of pore sizes of independent pores in a plane parallel to the sliding surface, a ratio (P75/P25) of a pore size of cumulative 75% by volume (P75) to a pore size of cumulative 25% by volume (P25) is 1.9 or less. The porous ceramic can be suitably used as slide member such as seal ring.

15 Claims, 4 Drawing Sheets

FOREIGN PATENT DOCUMENTS

| | | |
|---|---|---|
| JP | 60-071617 | 4/1985 |
| JP | 01-210406 | 8/1989 |
| JP | 02-055273 | 2/1990 |
| JP | 02055273 A | 2/1990 |
| JP | 02-256971 | 10/1990 |
| JP | 05-069066 | 3/1993 |
| JP | 2002-147617 | 5/2002 |
| JP | 2002-274953 | 9/2002 |
| JP | 3481774 | 10/2003 |
| JP | 2005-015246 | 1/2005 |
| JP | 2005-179100 | 7/2005 |
| WO | 2004022507 A2 | 3/2004 |

OTHER PUBLICATIONS

Chinese language office action dated Jun. 1, 2010 and its English language translation for corresponding Chinese application 200580049513.0.

Japanese language office action dated Feb. 15, 2011 and its English language translation for corresponding Japanese application 2005129165.

(a)

(b)

(a)

(b)

(a)

(b)

POROUS CERAMIC FOR SLIDE MEMBER, METHOD FOR PREPARING THE SAME, AND MECHANICAL SEAL RING

TECHNICAL FIELD

The present invention relates to a porous ceramic for slide member formed into seal ring in a mechanical seal mainly used as a shaft seal device in an automotive coolant pump, a refrigerator, or the like, and a method for preparing the same.

BACKGROUND ART

As one example of uses of porous ceramic for slide member, there is (mechanical) seal ring used for a mechanical seal. A mechanical seal is one of shaft seal devices for fluid equipment designed for fluid-tight seal of rotating parts of various machineries, which is composed of a driven ring capable of moving in an axial direction according to abrasion of sliding surface, and a stationary sheet ring, and has a mechanism for buffering vibrations, and functions to limit fluid leakage on the sliding surface substantially perpendicular to a shaft relatively rotating.

In the mechanical seal, as a basic structure thereof is shown in FIG. 1, a sheet ring 5 and a driven ring 6 are installed between a rotating shaft 1 and a casing 2. Further, sliding surface 3 onto which a sealing action is applied form a plane perpendicular to the rotating shaft 1 by confronting surface of the sheet ring 5 serving as a stationary member and the driven ring 6 serving as a rotating member to perform a sealing action. The driven ring 6 is supported in a shock-absorbing manner by a packing 7 so as to not contact the rotating shaft 1.

A collar 9 is fitted in the rotating shaft 1, and is fixed to the rotating shaft 1 with a setscrew 10. A coil spring 8 is provided to be wound around the rotating shaft 1 between the collar 9 and the packing 7. The driven ring 6 and the collar 9 are prevented from rotating relatively each other by a spring-back force of the coil spring 8, and the driven ring 6 can be moved only in an axial direction.

Both of the side end face of the sheet ring 6 and the side end face of the driven ring 6 are substantially perpendicular to the axis of the rotating shaft 1, and these faces form the sliding surface 3 whose surface roughness and flatness are reduced by lapping.

A fluid to be sealed is supplied from the exterior, and a part thereof penetrates into a microspace formed with the respective sliding surface 3 to act as a lubricant. The respective sliding surface 3 is configured to slidingly contact one another by a spring-back force of the coil spring 8.

A shock absorbing rubber 4 supports the sheet ring 5 in a shock absorbing manner from the inside of the casing 2, and further prevents the lubricant penetrating into the microspace from leaking to the inner circumference of the seal ring during a rotation of the rotating shaft 1. When the rotating shaft 1 rotates, the collar 9 is rotated, and the driven ring 6 as well is rotated via the coil spring 8 and the packing 7.

The sliding surface 3 is abraded away by friction caused in accordance with a rotation. However, a state in which the driven ring 6 is pressured to contact the sheet ring 5 is retained, which holds the adherence between the sliding surface 3. The vibration of the rotating shaft 1 onto the sliding surface 3 is absorbed by the shock-absorbing rubber 4 and the packing 7 to be hardly transmitted. The mechanical seal is comprised of the above-described structure, and the sheet ring 5 and the driven ring 6 are generally called (mechanical) seal rings.

As members for seal rings used here, for example, carbon material, cemented carbide, silicon carbide ceramic, alumina ceramic, and the like are mainly used. In recent years, a container has been increased in which silicon carbide ceramic whose coefficient of friction during sliding is low and whose smoothness is excellent is used.

Further, among the silicon carbide ceramic, porous silicon carbide ceramic in which pores are formed by using a pore forming agent during the steps of preparing the silicon carbide ceramic for the purpose of improving a sliding property, has drawn attention.

For example, in patent Document No. 1, there has been proposed a silicon carbide seal ring containing independent pores having a mean pore size of 10 to 40 μm to have a porosity of 3 to 13% by volume by using emulsion-polymerized polystyrene beads serving as a pore forming agent.

In patent Document No. 2, there has been proposed a silicon carbide seal ring in which independent pores having a mean pore size of 50 to 500 μm are formed to have a porosity in the range from 2 to 12% by volume by using crosslinkable polystyrene beads, crosslinkable polymethyl methacrylate beads, crosslinkable polyethylene beads, or the like as a pore forming agent.

In patent Document No. 3, there has been proposed a ceramic sliding device formed of porous ceramic in which independent open pore having a mean pore size of 5 to 30 μm is provided in sliding-contact surface between ceramic slide member, actual sliding area ratios of optionally selected 10 the sliding-contact surface is 40 to 90%, and a standard deviation value of the actual sliding area ratios of the 10 areas is from 4 to 10%, and a porosity measured by an Archimedes' principle is 4% or less.

Patent Document No. 1: Japanese Unexamined Patent Publication No. 05-69066
Patent Document No. 2: U.S. Pat. No. 5,395,807
Patent Document No. 3: Japanese Patent No. 3,481,774

DISCLOSURE OF THE INVENTION

Problems to be Solved by the Invention

However, in the seal rings proposed in patent Document No. 1 and No. 2, although the mean porosities of the independent pores therein are shown, when spherical crosslinkable polystyrene beads or emulsion-polymerized polystyrene beads are used as a pore forming agent as described above, the independent pores therein are made to be round bodies due to those pore forming agents being elastically recovered after being pressurized and formed because of the high compressive strength, which makes it impossible to control variation in pore sizes thereof. Therefore, there is the problem that it is impossible to obtain sufficient strength, which easily causes cracks by long-term use when those are used as slide member.

Further, in a seal ring using such a pore forming agent, there is the problem that microcracks beginning at independent pores are easily caused at the time of elastic recovery after being formed or at the time of being degreased, and it is difficult to obtain a sufficient thermal shock resisting temperature, which easily causes cracks when a temperature is raised by long-term use.

Moreover, because those pore forming agents have high compressive strength, a mean pore size of the independent pores easily vary. For example, when a cumulative distribution curve of pore sizes of independent pores in a plane parallel to the sliding surface is prepared, a ratio of a position of 75% by volume to a position of 25% by volume is a high ratio of 1.9 or more, and therefore, it is impossible to obtain porous ceramic for slide member having high strength.

Further, because a seal ring is usually structured to be thinner in thickness in a direction of a rotating shaft as shown in FIG. 1, when the independent pores are round bodies, there is the problem as well that, because a ratio of void portions is made higher on a cross section perpendicular to the sliding surface 3, the strength in this direction is made insufficient, and in particular, the strength of the portions as slide member onto which loads are applied is made insufficient, the seal ring cannot be used for a long time.

In patent Document No. 3, the homogeneous dispersion of pores is shown. However, although the porosity is a low porosity of 4% or less, the actual sliding area ratio is a high ratio in a range from 41 to 62% (which is a value described in the embodiment), i.e., a pore area ratio is a high ratio in a range from 38 to 59%.

Supposing that pores exist evenly, because the volume porosity and the area porosity are conformed to one another, it is surmised that concave grooves and processing flaws are adopted in the above-described document, and the pore area ratio is uniformed by including those, which is not appraisable about the dispersibility of the pores adopted by the pore forming agents. Additionally, there is the problem that, when abrasion on the sliding-contact surface progresses after long sliding driving, the concave grooves and the processing flaws disappear, and when planes having less pores adopted by the pore forming agents appear, an actual sliding surface area is increased, and a lubricant is not sufficiently supplied, which increases sliding torque. Further, when the porosity is high, in a container in which the pores are not sufficiently dispersed, there is a high possibility that the pores are made to be through pores. Therefore, there is a tendency to suppress the porosity in a conventional art, and there are cases in which it is impossible to sufficiently retain the lubricating property.

The present invention has been achieved in consideration of the problems described above, and it is an object of the present invention to easily and inexpensively provide porous ceramic for slide member, which secure the strength as slide member such as seal ring or the like, and have an excellent sliding property, and of high quality with no crack and chip.

Means for Solving the Problems

The present inventor and the others have found the means for solving the problems structured as follows as a result of devoting themselves to studies repeatedly in order to solve the problems, and thus the present invention has been completed.

(1) A porous ceramic for slide member including independent pores having a pore size of 5 μm or more, wherein the independent pore is flattened body having minor axis in a direction perpendicular to a sliding surface, and a cross sectional area (S1) of an independent pore at a cross section perpendicular to the sliding surface is 95% or less of an area (S2) of a complete round having a diameter which is the same length as a major axis of the cross section of the independent pore, and in a cumulative distribution curve of pore sizes of independent pores in a plane parallel to the sliding surface, a ratio (P75/P25) of a pore size of cumulative 75% by volume (P75) to a pore size of cumulative 25% by volume (P25) is 1.9 or less.

(2) The porous ceramic for slide member according to the paragraph (1), wherein a four-point flexural strength is 200 MPa or more.

(3) The porous ceramic for slide member according to the paragraph (1), wherein a thermal shock resisting temperature is 300° C. or higher.

(4) The porous ceramic for slide member according to the paragraph (1), wherein some of the independent pores are open pore formed on the sliding surface, and pore size of the open pore is 100 .mu.m or less.

(5) The porous ceramic for slide member according to the paragraph (1), wherein a porosity in 10 areas measuring 1.8 mm×1.3 mm randomly selected at intervals of 1 mm on the sliding surface is from 6 to 18%, and a standard deviation in a pore area ratio of the open pore formed on the sliding surface is 2% or less.

(6) The porous ceramic for slide member according to the paragraph (5), wherein a sum total of numbers of pores in the 10 areas is from 220 to 330, and a standard deviation therein is 55 or less.

(7) The porous ceramic for slide member according to the paragraph (5), wherein a number of pores having a pore size of 80 μm or more in the 10 areas is 5% or less of the total number of pores.

(8) The porous ceramic for slide member according to the paragraph (1), comprising silicon carbide ceramic.

(9) The porous ceramic for slide member according to the paragraph (4), including free carbon in the open pore.

(10) The porous ceramic for slide member according to claim 1, wherein a maximum pore size of the independent pore is 120 μm or less.

(11) A method for preparing the porous ceramic for slide member according to claim 1, comprising the steps of:

mixing spherical resin beads serving as a pore forming agent and a granulated powder with agitating to obtain a mixed raw material, pressure-forming the mixed raw material, thereby plastically deforming the pore forming agent in a pressure direction to obtain a green body having a desired shape, and sintering the green body with heating to obtain ceramic.

(12) A method for preparing the porous ceramic for slide member according to the paragraph (1), comprising the steps of:

mixing spherical resin beads serving as a pore forming agent and a granulated powder with agitating to obtain a mixed raw material, alternately charging the mixed raw material and another granulated powder into a container to obtain a powder raw material using a single shaft rotary mixer, pressure-forming the mixed raw material, thereby plastically deforming the pore forming agent in a pressure direction to obtain a green body having a desired shape, and sintering the green body with heating to obtain ceramic.

(13) The method for preparing the porous ceramic for slide member according to the paragraph (11) or (12), wherein the resin beads are at least one kind selected from resin beads formed of silicone, resin beads formed of polystyrene, and resin beads formed of acrylic-styrene copolymer, and are suspension-polymerized noncrosslinkable resin beads.

(14) The method for preparing the porous ceramic for slide member according to the paragraph (11) or (12), wherein at least one kind selected from a carbon powder, a boron powder, an alumina powder, and an yttria powder is used as a sintering additive.

(15) A mechanical seal ring comprising the porous ceramic for slide member according to the paragraph (1).

Effects of the Invention

In accordance with an aspect of the paragraph (1), independent pores in which a variation in a mean pore size is reduced can be obtained, and porous ceramic for slide member with high strength can be obtained.

In accordance with an aspect of the paragraph (2), because the porous ceramic is not restricted under use environments and use conditions, the porous ceramic can be used even under severe conditions, which makes it possible to broaden the scope of applications.

In accordance with an aspect of the paragraph (3), even in a container of porous ceramic such as a mechanical seal in which frictional heat is generated during starting, and heat cracks are easily caused by receiving a thermal shock, it is possible to prevent heat cracks.

In accordance with an aspect of the paragraph (4), total length of edge formed by open pore and the sliding surface is shortened, and even when the other member slidingly contacting the slide member according to the present invention is a soft material, it is possible to avoid the risk of damaging the opponent member by the edge.

In accordance with an aspect of the paragraph (5), because the porosity is high, and the sliding property is improved, and the dispersion state of the pores is uniformed, it is possible to prevent the pores from becoming though-pores, and for example, when the porous ceramic is used for a mechanical seal for the purpose of fluid-tight sealing, it is possible to prevent the fluid serving as an object to be hermetically sealed from leaking at a maximum.

In accordance with an aspect of the paragraph (6), aggregating pores or pores collectively existing disappear, it is possible to suppress abnormal abrasion in the other material generally called a grater phenomenon, and as a result, it is possible to reduce an extent of the abrasion of the other material which is even a soft material such as carbon.

In particular, in a grater phenomenon that abnormal abrasion in the other material is caused, when there are many pores having edged with long total lengths formed by open pore and sliding surface, abrasion thereof is remarkable, and therefore, in accordance with an aspect of the paragraph (7) in which the number of pores having a pore size of 80 μm or more is 5% or less of the total number of pores, it is possible to further suppress the progress in abrasion.

In accordance with an aspect of the (8), porous ceramic for slide member excellent in abrasion resistance can be obtained.

In accordance with an aspect of the paragraph (9), free carbon is supplied along with a lubricant from open pore onto the sliding surface, and by a lubrication action noise or linking from being generated even in a slide member in which an abnormal noise or linking are generated in the early phase of sliding.

In accordance with an aspect of the paragraph (10), it is possible to retrain the strength of the porous ceramic for slide member of the present invention.

In accordance with aspects of the paragraphs (11) and (12), it is possible to appropriately supply a lubricant from the open pore to the slide member, and to secure the sufficient strength as slide member.

In particular, the resin beads in the paragraph (13) have low compressive strength less than or equal to 1.2 MPa, and are easily plastically deformed under a pressure usually used for forming a ceramic green body, for example, 98 MPa, and flattened independent pores can be obtained, which are suitable therefor.

In accordance with an aspect of the paragraph (14), it is possible to increase a thermal shock resisting temperature, or to suppress an abnormal noise or linking easily generated in the early phase of sliding by improving a sliding property.

In accordance with an aspect of the paragraph (15), provided that the porous ceramic is used especially for seal ring for an automotive coolant pump, the seal ring can be highly-reliable and long-life slide member.

PREFERRED EMBODIMENTS FOR CARRYING OUT THE INVENTION

<Porous Ceramic for Slide Member>

Figure 1:
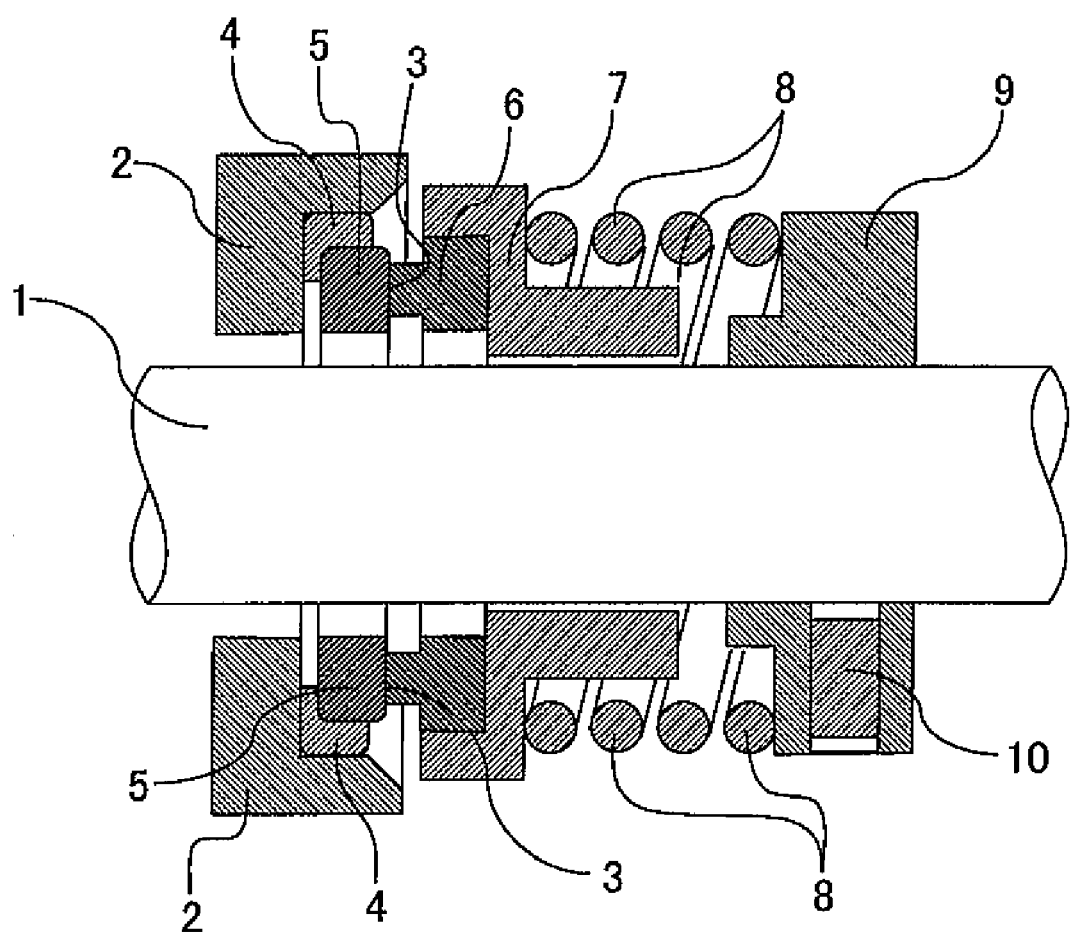
FIG. 1 is a schematic cross sectional view showing a basic structure of a mechanical seal using porous ceramic for slide member according to the present invention.

A mechanical seal, which is one embodiment of porous ceramic for slide member (hereinafter simply called porous ceramic according to the present invention will now be described in detail with reference to the accompanying drawings. FIG. 1 is a schematic cross sectional view showing a basic structure of the mechanical seal. FIG. 2A is an enlarged schematic cross sectional view showing a cross section perpendicular to sliding surface in a sheet ring of FIG. 1, and FIG. 2B is an enlarged schematic cross sectional view showing a cross section parallel to the sliding surface in the sheet ring of FIG. 1. FIG. 3A is a schematic explanatory diagram for explanation of a spheroid of FIG. 2A, and FIG. 3B is a schematic explanatory diagram for explanation of a structure in a shape approximate to the spheroid of FIG. 2A. FIG. 4 is a schematic explanatory diagram for explanation of an area ratio (S1/S2) according to the present invention.

As shown in FIG. 1, the mechanical seal is one of shaft sealing devices for fluid equipment for the purpose of fluid-tight sealing of rotating parts in various machineries, and a heart thereof is (mechanical) seal rings composed of the sheet ring 5 and the driven ring 6 described in the paragraph of the conventional art. The sheet ring 5 and the driven ring 6 are respectively formed of porous ceramic of the present invention.

Figure 2:
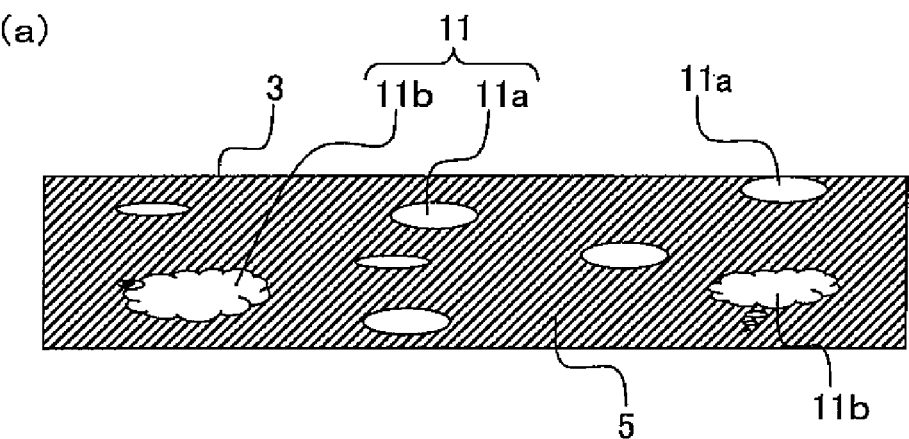
FIG. 2A is an enlarged schematic cross sectional view showing a cross section perpendicular to sliding surface in a sheet ring of FIG. 1.
FIG. 2B is an enlarged schematic cross sectional view showing a cross section parallel to the sliding surface in the sheet ring of FIG. 1.
Figure 2:
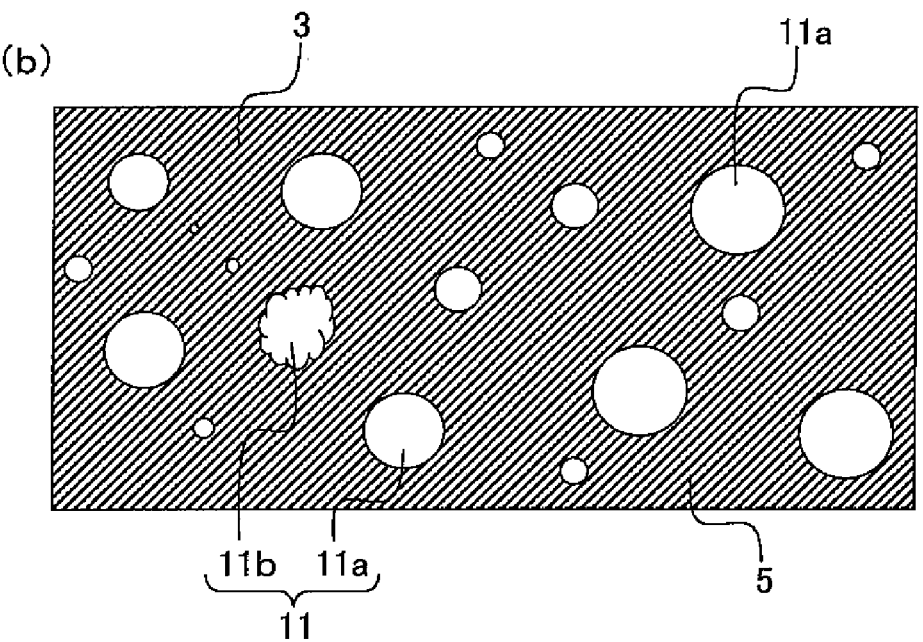
Figure 3:
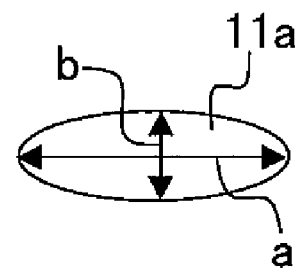
FIG. 3A is a schematic explanatory diagram for explanation of a spheroid of FIG. 2A.
FIG. 3B is an enlarges explanatory diagram for explanation of a structure in a shape approximate to the spheroid of FIG. 2A.
Figure 3:
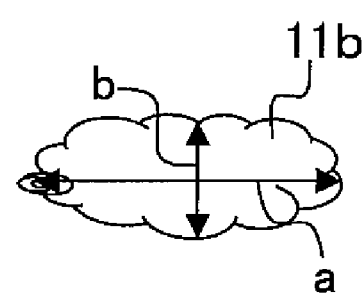
Figure 4:
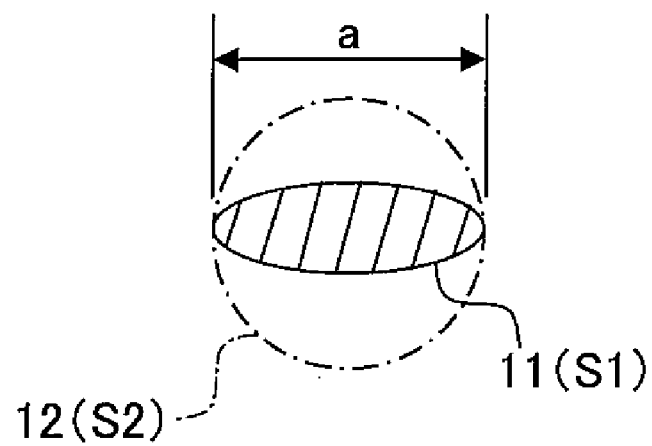
FIG. 4 is a schematic explanatory diagram for explanation of an area ratio (S1/S2) according to the present invention.

In the porous ceramic of the present invention, as shown in FIGS. 2 and 3, independent pores 11 having a pore size of 5 μm or more is flattened body having minor axis in a direction perpendicular to the sliding surface 3, and it have been found out that it is important that a cross sectional area (S1) of an independent pore 11 on a cross section perpendicular to the sliding surface 3 is 95% or less of an area (S2) of a complete round having a diameter of a major axis of the cross section of the independent pore 11, and in a cumulative distribution curve of pore sizes of the independent pores 11 in an optional portion in a plane parallel to the sliding surface 3, a ratio (P75/P25) of a pore size of cumulative 75% by volume (P75) to a pore size of cumulative 25% by volume (P25) is 1.9 or less.

The independent pores 11 in the present invention mean independent pores which are not communicated with the other pores as shown in FIG. 2, and are composed of independent pores having a pore size of 5 μm or more existing inside the porous ceramic and open pore having a pore size of 5 μm or more existing on surface of the porous ceramic such as the sliding surface 3. A maximum pore size of the independent pores 11 is preferably 120 μm or less from the standpoint of retaining the strength.

The independent pores 11 include the independent pores 11 originally contained in a green body under various conditions such as a compacting pressure, and the independent pores 11 formed of resin beads plastically deformed, and by controlling the pore size of the independent pore 11 to 5 μm or more, the independent pores 11 formed of resin beads plastically deformed account for a large percentage of the above-described two kinds of independent pores 11.

The flattened body compressed in a direction perpendicular to the sliding surface 3 serving as the independent pores 11 are spheroids 11a and structures 11b approximate to a spheroid, for example, as shown in FIGS. 2 and 3, which means a structure in which an axis a perpendicular to the axis b is longer than an axis b in a compressing direction.

With respect to a pore size of the independent pore 11, when the independent pore 11 is a flattened body compressed from a direction perpendicular to the sliding surface 3, and is the spheroid 11a, a diameter on a cross section parallel to the sliding surface 3 and including the rotation center is regarded as a pore size of the independent pore 11. Further, when the independent pore 11 is a flattened body compressed from a direction perpendicular to the sliding surface 3, and is the structure 11b partially cut off or partially distorted in shape, which is approximate to a spheroid, an approximate virtual spheroid is prepared, and a diameter on a cross section parallel to the sliding surface 3 and including the rotation center is regarded as a pore size of the independent pore 11. A microscope is used for measurement thereof, and the measurement can be carried out, for example, at a magnification of 200 times by the microscope.

Here, as shown in FIG. 2A, provided that the independent pores 11 are made to be flattened body compressed in a direction perpendicular to the sliding surface 3, as compared with a container in which the independent pores 11 are complete rounds, it is possible to reduce a ratio of void portions on a cross section perpendicular to the sliding surface 3, which makes it possible to secure the strength required in this direction. In particular, the shapes thereof are preferably spheroids or bodies approximate thereto which are substantially circular forms as shown in FIG. 2A in a plane parallel to the sliding surface 3, and are elliptical shapes as shown in FIG. 2A in a plane perpendicular to the sliding surface 3.

Further, as shown in FIG. 4, provided that a cross sectional area (S1) of the independent pore 11 on a cross section perpendicular to the sliding surface 3 is controlled to 95% or less of an area (S2) in a container of a complete round 12 having a diameter of a major axis a of the cross section of the independent pore 11, i.e., an area ratio (S1/S2) is controlled to 0.95 or less, it is possible to reduce a ratio of void portions on the cross section perpendicular to the sliding surface 3, i.e., of void portions in a direction required to have high strength during sliding, which makes it possible to make the strength of the porous ceramic higher. Here, the value of the aforementioned 95% [area ratio (S1/S2): 0.95] which is a value of a cross sectional area (S1) to an area (S2) means that area ratios with a respect to a plurality of the individual independent pores 11 are measured, and "a mean value" thereof is 95% [an area ratio (S1/S2): 0.95]. With respect to a concrete number of measurements, given that the independent pores 11 are 10 or more, and at least 10 independent pores are measured, and a value calculated as a mean value thereof is 95% or less [an area ratio (S1/S2): 0.95].

On the other hand, when the cross sectional area (S1) is greater than 95% of the area (S2), i.e., an area ratio (S1/S2) is more than 0.95, a ratio of void portions on the cross section perpendicular to the sliding surface 3 is made higher, and the strength in this direction is made insufficient. In particular, the cross sectional area (S1) is preferably 91% or less of the area (S2), i.e., an area ratio (S1/S2) is preferably 0.91 or less.

In the seal ring shown in FIG. 1, an area ratio (S1/S2) can be determined, for example, such that a cross section perpendicular to the sliding surface 3 is mirror-finished, and the cross section is photographed at a magnification of 200 times by a microscope. Further, with respect to a cumulative distribution curve of pore sizes of the independent pores 11 which will be described below, the sliding surface 3 is mirror-finished, and the surface is photographed at a magnification of 200 times by a microscope, and a range is set such that a visual field is 0.146 mm² in the photograph, and all the pore sizes of the independent pores having a pore size of 5 μm or more within this range are measured. Thereafter, a cumulative distribution curve can be prepared with a class interval of 5 μm. In order to obtain the above-described cross section and the sliding surface 3, it is recommended that those be first made to be flat surface by a flat-surface grinding machine, and next crude processing be applied thereto by a lapping machine made of alumina by using diamond abrasive grains having a mean grain diameter of 3 μm, and thereafter, mirror-finish processing be performed thereonto by a lapping machine made of tin such that an arithmetic mean roughness Ra is from 0.62 to 1.47 μm.

Moreover, provided that a ratio (P75/P25) of a pore size of cumulative 75% by volume (P75) to a pore size of cumulative 25% by volume (P25) is controlled 1.9 or less on the cumulative distribution curve of the pore sizes of the independent pores 11 in the plane parallel to the sliding surface 3, it is possible to suppress a variation in the pore sizes, and to secure the sufficient strength as slide member. The reason for that a ratio (P75/P25) of a pore size of cumulative 75% by volume (P75) to a pore size of cumulative 25% by volume (P25) is specified is that a feature of an entire distribution of the various diameters of the independent pores appears most prominently therein.

On the other hand, when a ratio (P75/P25) is more than 1.9, a variation in the pore sizes is large, which makes it impossible to secure the sufficient strength as slide member. A ratio (P75/P25) is preferably 1.7 or less.

Where the cumulative distribution curve of the pore sizes of the independent pores 11 means a curve denoting a cumulative distribution of the pore sizes given that an abscissa on a two-dimensional graph is for pore sizes of the independent pores 11, and an ordinate is for cumulative ratios of the pore sizes, which denotes a distribution range of the pore sizes of the independent pores 11.

Figure 5:
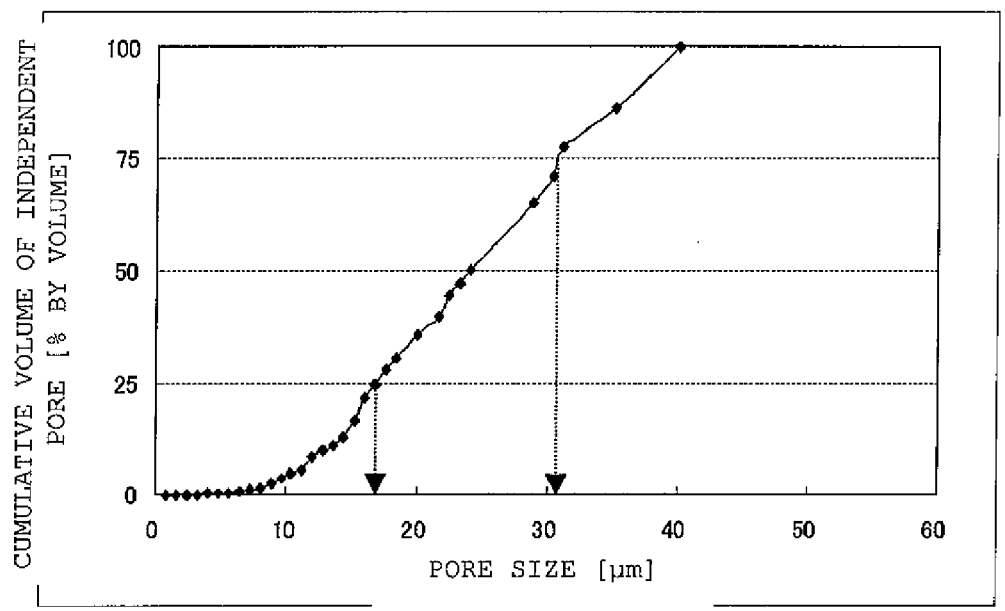
FIGS. 5A and 5B are graphs showing one examples of cumulative distribution curves according to the present invention.
Figure 5:
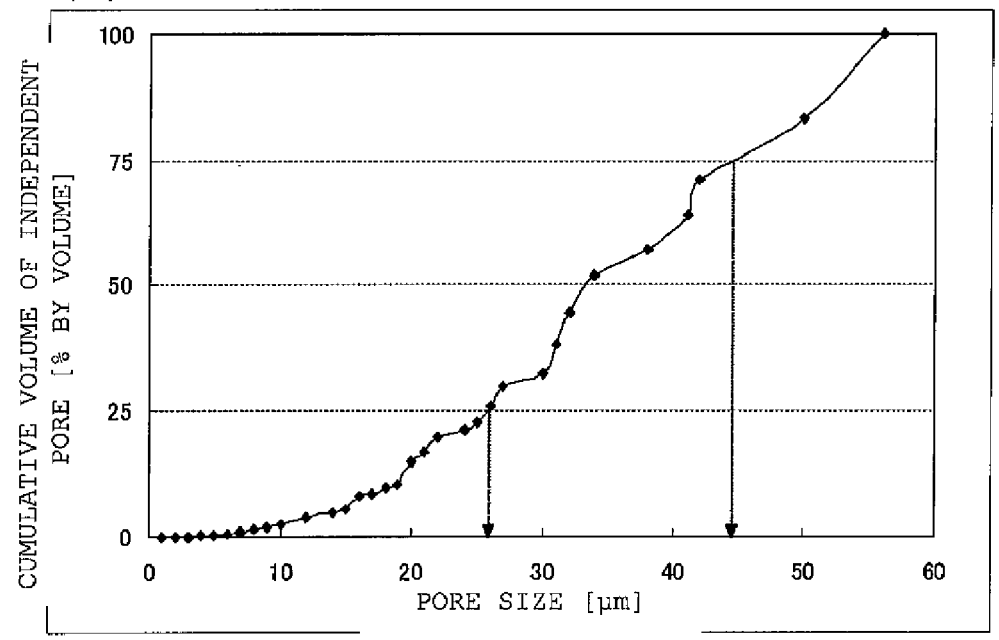

FIG. 5 is graphs showing one examples of cumulative distribution curves according to the present invention. Where FIG. 5A is a container in which a ratio (P75/P25) is 1.9, and FIG. 5B is a container in which a ratio (P75/P25) is 1.7. As shown in the drawings, a cumulative distribution curve is shown by a coordinate in which pore sizes of independent pores are on an X-axis, and cumulative volumes of independent pores are on a Y-axis, and is calculated such that respective pore sizes when a cumulative volume of the pores with diameters measured by the above-described method is taken.

Further, the four-point flexural strength of the above-described porous ceramic is 200 MPa or more, and preferably 230 MPa or more. In accordance therewith, the porous ceramic can be used even under severe conditions, which makes it possible to broaden the scope of applications. Moreover, it is possible to reduce a ratio of void portions on the cross section perpendicular to the sliding surface 3, and to suppress a variation in the pore sizes. In contrast thereto, when the four-point flexural strength is less than 200 MPa, use environments and/or use conditions are limited, which is not suitable therefor.

With respect to the four-point flexural strength, it is recommended that the porous ceramic for slide member be prepared to have a shape which is the same as a transverse test piece compliant with JIS C 2141-1992, and four-point flexural strength be measured according to the JIS standard.

Moreover, a thermal shock resisting temperature of the porous ceramic is preferably 300° C. or higher. In accordance therewith, even when the porous ceramic is used as one, such as a mechanical seal, receiving a thermal shock by frictional heat being generated during starting to easily cause heat cracks therein, it is possible to prevent heat cracks.

For example, when alumina, yttria, or the like is used as a sintering additive, it is possible to achieve that a thermal shock resisting temperature is controlled to 300° C. or higher. This is because, by using these sintering additives, it is possible to improve fracture toughness in grain boundary phase, and it is possible to suppress a variation in pore sizes by reducing a ratio of void portions on a cross section perpendicular to the sliding surface 3, which makes it possible to make a thermal shock resisting temperature high.

In order for four-point flexural strength of the porous ceramic to be 200 MPa or more, and for a thermal shock resisting temperature of the porous ceramic to be 300° C. or higher, a porosity of the independent pores 11 must be 18% or less.

Further, some of the independent pores 11 are open pore formed on the sliding surface 3, and pore size of the open pore is preferably 100 μm or less. In accordance therewith, total length of edge formed by the open pore and the sliding surface 3 is shortened, and even when the other member slidingly contacting the slide member formed of the porous ceramic of the present invention is a soft material such as carbon, it is possible to prevent the edge from damaging the opponent member.

On the other hand, when pore sizes of the open pore is more than 100 μm, total length of edge formed by the open pore and the sliding surface 3 is lengthened, and when the other member is a soft material, the risk of damaging the opponent member by the edge is increased. In particular, the pore size of the open pore is preferably 80 μm or less. Further, the open pore formed on the sliding surface 3 is preferably 7% by volume or more to all the pores.

In order for some of the independent pores 11 to be open pore formed on the sliding surface 3, and for the pore size of the open pore to be 100 μm or less, it is recommended that a maximum grain diameter of the resin beads serving as a pore forming agent be made 125 μm or less, and the resin beads be evenly dispersed into granulated powder at a stage of preparing a mixed raw material.

The shape of the open pore is virtual spheroid or body approximate thereto, and a cross section passing through the rotation center of a virtual spheroid is preferably substantially conformed to the sliding surface. This is because, due to a cross section passing through the rotation center of a virtual spheroid being made substantially conformed to the sliding surface, it is possible to make both of an area of the opening and a volume of the open pore greater, and as a result, a lubricant from the exterior can be easily stored inside the open pore, and at the same time, it is easy to appropriately supply the lubricant from the open pore.

In the present invention, a porosity in 10 areas of 1.8 mm×1.3 mm randomly selected at intervals of 1 mm on the sliding surface 3 is from 6 to 18%, and a standard deviation in a pore area ratio of the open pore formed on the sliding surface 3 is preferably 2% or less. In accordance therewith, even when a state of the sliding-contact surface in the early phase of driving is change due to the progress of abrasion, the independent pore in the ceramic is made to be new open pore, which function as a source of supply of the lubricant, and it is possible to supply the lubricant stably onto the sliding-contact surface, which makes it possible to not change the sliding property in the early phase of driving and after long-term driving to be constant. Additionally, because there is no through pore even in a state in which the ceramic have a high porosity and an excellent lubricating property, the fluid serving as an object to be hermetically sealed does not leak through the ceramic.

On the other hand, when a standard deviation in a pore area ratio is more than 2.0%, the porous ceramic get into a state in which the pores are poorly dispersed, and the independent pores condense into through pores, and therefore, the fluid serving as an object to be hermetically sealed leaks through the porous ceramic. Further, when planes having less pores are exposed by abrasion, it is impossible to appropriately supply the lubricant onto the sliding-contact surface, which causes an increase in temperature at the periphery of the slide member by frictional heat, generation of a scream during sliding, and linking, which leads to a reduction in the sliding property. A standard deviation in a pore area ratio is more preferably 1.5% or less.

A pore area ratio can be determined by using an image analysis device after the porous ceramic serving as an object is mirror-finished and the mirror finished surface is photographed at a magnification of 50 times. Further, in order to obtain a mirror finished surface, it is recommended that those be first made to be flat surface by a flat-surface grinding machine, and next crude processing be applied thereonto by a lapping machine made of alumina by using diamond abrasive grains whose mean grain diameter is 3 μm, and thereafter, mirror-finish processing be performed thereonto by a lapping machine made of tin such that an arithmetic mean roughness Ra is from 0.62 to 1.47 μm. Further, the term mirror finished surface herein is a state in which there are no processing flaws on dense portions except for pores formed by a pore forming agent. An arithmetic mean roughness Ra is a value acquired by a measurement by using a stylus method surface roughness meter.

Further, in the porous ceramic, 10 areas measuring 1.8 mm×1.3 mm are randomly selected at intervals of 1 mm on the sliding surface 3, and it is preferable that a sum total of numbers of pores in the respective areas is from 220 to 330, and a standard deviation therein is 55 or less. On the other hand, when a standard deviation therein is greater than 55, portions having the number of pores of less than 220 or more than 330 are made, which has a possibility that through-pores are formed and the fluid serving as an object to be hermetically sealed leaks therefrom. Further, aggregating pores or portions at which pores have concentrated cause abnormal abrasion on the other material generally called a grater phenomenon, and in particular, when the other material is a soft material such as carbon, abrasion thereon appears remarkably. Therefore, a hard material must be selected as the other material, thereby being under design limitation. A standard deviation in a number of pores is more preferably 30 or less.

The number of pores can be determined, in the same way as described above, by using an image analysis device after the porous ceramic serving as an object is mirror-finished and the mirror finished surface is photographed at a magnification of 50 times.

Moreover, in the porous ceramic, a number of pores having a pore size is 80 μm or more on the observation areas is preferably 5% or less of the total number of pores. In contrast thereto, when a ratio of a number of pores having a pore size is 80 μm or more is more than 5%, there are portions in which there are a large number of pores having edges with long total lengths formed by the open pore and the sliding surface, and therefore, a grater phenomenon is more remarkably brought about, which has a high possibility that abrasion is progressed. The ratio is more preferably 4% or less.

Here, the porous ceramic of the present invention is preferably formed of silicon carbide ceramic. In accordance therewith, porous ceramic having excellent abrasion resistance can be obtained. This is because silicon carbide ceramic itself has high hardness, and carbon structuring silicon carbide has excellent adsorptive activity, which makes it possible to realize low friction.

Further, it is preferable for the porous ceramic to include free carbon in the open pore among the independent pores 11. In accordance therewith, the free carbon is supplied along with the lubricant from the open pore onto the sliding surface 3, and by a lubrication action of the free carbon, it is possible to prevent an abnormal noise and linking from being generated even in a slide member generating an abnormal noise and linking in the early phase of sliding.

In order to include free carbon in the open pore, as will be described in detail later, it suffices to use carbon powder as a sintering additive. In accordance therewith, carbon remaining in the open pore at the time of sintering exert a lubrication action as free carbon during sliding.

<Method for Preparation>

One embodiment of a method for preparing porous ceramic of the present invention will now be described with an example of silicon carbide ceramic. A method for the preparation according to the present embodiment includes the steps of mixing spherical resin beads serving as a pore forming agent and a granulated powder with agitating to obtain a mixed raw material, pressure-forming the mixed raw material, thereby plastically deforming the pore forming agent in a pressure direction to obtain a green body having a desired shape, and sintering the green body with heating to obtain ceramic. In accordance with the method for the preparation, it is possible to appropriately supply a lubricant onto sliding surface from open pore, and to obtain porous ceramic capable of securing sufficient strength as slide member.

To describe concretely, first, a rare-earth oxide powder such as an alumina powder or an yttria powder, a dispersing agent, and water are added to a silicon carbide powder, followed by mixing using a ball mill to obtain a slurry. A forming auxiliary agent is added to the slurry and, after mixing, the mixture is spray-dried to prepare a granulated powder. Next, resin beads serving as a pore forming agent is mixed with the granulated powder to prepare a mixed raw material.

The rare-earth oxide powder such as alumina powder or yttria powder functions as a sintering additive, and an alumina powder or a rare-earth oxide powder is preferably used for slide member required to have a thermal shock resisting temperature of 300° C. or higher. Further, as a sintering additive except for the alumina powder or the rare-earth oxide powder, a carbon powder and a borosilicate powder may be used in combination. When the carbon powder is used as the sintering additive, it is possible to easily include free carbon in open pore. Therefore, the sliding property is improved due to the free carbon flowing onto the sliding surface 3, which is suitable for slide member in which an abnormal noise or linking is easily generated in the early phase of sliding.

Moreover, in order for the pore sizes of the independent pores 11 to be 5 μm or more, a minimum grain diameter of the resin beads is preferably controlled to 10 μm or more, and in order for the pore sizes to be 120 μm or less, a maximum grain diameter of the resin beads is preferably controlled to 150 μm or less. Further, in order for the pore size of the open pore formed on the sliding surface 3 to be 100 μm or less, a maximum grain diameter of the resin beads is preferably controlled to 125 μm or less, and a mean grain diameter thereof is preferably controlled to 50 μm or less.

It is important that a pore forming agent which is spherical and capable of being plastically deformed in a pressure direction under a compacting pressure onto a ceramic raw material is used. When a pore forming agent made to be a flattened shape in advance is used, the flow property of the pore forming agent deteriorates, which takes a longer mixing time in order to disperse the pore forming agent evenly, which causes cost increases. Further, when the pore forming agent is not added to the slurry, but is mixed with ceramic granules, the ceramic granules are broken by lengthening a mixing time, and the flow property of the ceramic raw material deteriorates, which causes poorly filling and the like during compacting, which decreases the production yield.

Next, after the mixed raw material is pressure-formed to obtain a ceramic green body having a desired shape under a pressure of, for example, 98 MPa or more, at which the resin beads can be plastically deformed in a pressure direction, the ceramic green body is warmed up for 10 to 40 hours in the nitrogen atmosphere, and is held for 2 to 10 hours at 450 to 650° C., and thereafter is degreased by natural cooling.

It is important to carry out the pressure forming and form under a pressure at which the resin beads can be plastically deformed in a pressure direction. Due to the resin beads being plastically deformed in a pressure direction, it is possible to appropriately supply the lubricant stored in the open pore onto the sliding surface 3 from the open pore existing on the sliding surface 3 after sintering, and to secure the sufficient strength as slide member.

In particular, the resin beads are at least one kind selected from resin beads formed of silicone, resin beads formed of polystyrene, and resin beads formed of acrylic-styrene copolymer, and are preferably suspension-polymerized non-crosslinkable resin beads. This is because these resin beads have low compressive strength of 1.2 MPa or less, and those are easily plastically deformed under a pressure of, for example, 98 MPa, which is usually used for forming a ceramic green body, which makes it possible to obtain flattened independent pores 11.

On the other hand, when resin beads which are elastically deformed in a pressure direction, or are not deformed even by being pressured, for example, resin beads formed of acrylic or crosslinkable polystyrene are used, independent pores are made spherical, and it is impossible to sufficiently reduce a ratio of void portions on a cross section perpendicular to the sliding surface, which makes it impossible to secure the sufficient strength as slide member.

Then, the degreased ceramic green body is kept and sintered for 3 to 5 hours at 1800 to 1900° C. in the inactive gas atmosphere such as argon, to be formed into porous ceramic of the present invention.

With respect to the obtained porous ceramic, it suffices to apply processing such as grinding or polishing onto a plane facing slide members facing each other as needed. For example, after the plane is made to be a flat surface by a double-ended grinding machine, a flat-surface grinding machine, or the like, when the ceramic is used as a seal ring, crude processing may be applied thereonto by a lapping machine made of alumina by using diamond abrasive grains having a mean grain size is 3 μm, and mirror-finish processing may be performed thereonto such that an arithmetic mean roughness Ra is made to be 3.00 μm or less by a lapping machine made of tin in order to be able to retain the sealing performance.

Another embodiment of a method for preparing porous ceramic will now be described. There is a difference from the above-described embodiment in the point that this embodiment includes a process of obtaining a powder raw material by using a single shaft rotary mixer after alternately charging the mixed raw material in the embodiment described above and another granulated powder into a container. Namely, the method for the preparation according to the present embodiment includes the steps of mixing spherical resin beads serving as a pore forming agent and a granulated powder with agitating to obtain a mixed raw material, alternately charging the mixed raw material and another granulated powder into a container to obtain a powder raw material using a single shaft rotary mixer, pressure-forming the mixed raw material, thereby plastically deforming the pore forming agent in a pressure direction to obtain a green body having a desired shape, and sintering the green body with heating to obtain ceramic.

The present invention is particularly preferable for obtaining porous ceramic in which a porosity in 10 areas of 1.8 mm×1.3 mm randomly selected at intervals of 1 mm on the sliding surface 3 is from 6 to 18%, and a standard deviation in a pore area ratio of open pore formed on the sliding surface 3 is 2% or less, and a sum total of numbers of pores in the areas is from 220 to 330, and a standard deviation therein is 55 or less.

Specifically, a mean grain diameter of the spherical resin beads used for obtaining the porous ceramic is preferably from about 25 to 50 μm.

Further, in the step of obtaining the mixed raw material, an amount of a granulated powder to be added is preferably substantially the same by volume as that of the resin beads. Specifically, it is recommended that the mixed raw material be prepared by mixing with agitating resin beads of 14 to 15% by volume to all the granulated powder, and granulated powder of 15% by volume to all the granulated powder. After the mixed raw material and the remaining granulated powder are alternately laminated, a powder raw material can be obtained using a single shaft rotary mixer.

Then, when the powder raw material is pressure-formed in the same manner as in case of the mixed raw material in the embodiment described above, the pore forming agent is plastically deformed in a pressure direction to obtain a green body having a desired shape, and the above-described porous ceramic can be obtained by sintering the green body with heating.

The other structures except for the above-described one is the same as those in the embodiment described above, and description thereof will be omitted.

The porous ceramic prepared by the above method for the preparation are not only capable of obtaining high strength, but also capable of preventing heat cracks, damaging onto the other material, and occurrences of an abnormal noise and linking, and thus the porous ceramic have high quality and highly reliability.

Accordingly, the above-described porous ceramic is extremely suitable for use in automotive coolant pump seal ring required to have high strength and an excellent sliding property. Moreover, the above-described ceramic is preferable for use in slide member such as bearing member, faucet member, or pump member in addition to seal ring.

Embodiments of the present invention will now be described in detail, but the present invention is not limited by these embodiments.

Example 1

In a ball mill, a silicon carbide powder, an alumina powder, an yttria powder, a dispersing agent and water were added in each predetermined amount, followed by mixing for 48 hours to obtain a slurry. To the slurry, a forming auxiliary agent was added, followed by mixing and spray drying to obtain a granulated powder having a mean particle size of 18 μm.

To the granulated powder, 8% by weight resin beads shown in Table 1 were added, followed by mixing to obtain a mixed raw material. The mixed raw material was formed into a green body having a predetermined shape under a pressure of 98 MPa to obtain samples Nos. 1 to 11. The samples Nos. 1 to 11 were degreased by maintaining in a nitrogen atmosphere at 600° C. for 5 hours and then sintered by maintaining in an argon atmosphere at 1,850° C. for 3 hours. The samples Nos. 1 to 11 are respectively constituted from 3 disk bodies for evaluation of independent pores in which at least the top surface or the bottom surface serves as a sliding surface, and 10 transverse test pieces for evaluation of four-point flexural strength.

A value of a cross sectional area (S1) to an area (S2) of independent pores of the resulting ceramic, a ratio (P75/P25) of a pore size of cumulative 75% by volume (P75) to a pore size of cumulative 25% by volume (P25), and a four-point flexural strength were evaluated. The respective evaluation methods are shown below and the evaluation results are shown in Table 1.

With respect to the value of a cross sectional area (S1) to an area (S2) of independent pores, using 3 disk bodies, a cross section perpendicular to the sliding surface was mirror finished and then an optional cross section to each disk body was photographed at a magnification of 200 times by a microscope. In each disk body, 10 independent pores were measured and the mean was taken as the value of a cross sectional area (S1) to an area (S2).

With respect to a cumulative distribution curve of pore sizes of the independent pores, the sliding surface of 3 disk bodies were mirror finished, and the surface is photographed at a magnification of 200 times by a microscope, and a range is set such that a visual field is 0.146 mm² in the photograph. Then, all the pore sizes of the independent pores having a pore size of 5 μm or more within this range were measured. Thereafter, a cumulative distribution curve was prepared with a class interval of 5 μm and a ratio (P75/P25) of cumulative distribution was calculated from the cumulative distribution curve.

In the value of a cross sectional area (S1) to an area (S2) of independent pores and the ratio (P75/P25) of cumulative distribution, the above-described cross section and the sliding surface are made to be flat surface by a flat-surface grinding machine, and next crude processing be applied thereonto by a lapping machine made of alumina by using diamond abrasive grains having a mean grain diameter of 3 μm, and thereafter, mirror-finish processing be performed thereonto by a lapping machine made of tin such that an arithmetic mean roughness Ra is from 0.62 to 1.47 μm. It has been confirmed from each photomicrograph obtained in the value of a cross sectional area (S1) to an area (S2) of independent pores and the ratio (P75/P25) of cumulative distribution that the samples No. 1 to 11 include independent pores having a particle size of 5 μm and the independent pore is flattened body having minor axis in a direction perpendicular to sliding surface.

The four-point flexural strength was measured according to JIS C 2141-1992.

TABLE 1

| Sample No. | Kind of pore forming agent | Mean particle size of pore forming agent (μm) | Value of cross sectional area (S1) to area (S2) (%) | P75/P25 | Four-point flexural strength (MPa) | | | |
|---|---|---|---|---|---|---|---|---|
| | | | | | Mean | Maximum | Minimum | Range |
| 1* | Acryl | 37.6 | 96.0 | 1.8 | 190.3 | 200.4 | 176.9 | 23.5 |
| 2* | | 35.9 | | 2.0 | 198 | 216.2 | 174.7 | 41.5 |
| 3 | Suspension- | 36.5 | 95.0 | 1.5 | 245.7 | 258.7 | 233.4 | 25.3 |
| 4 | polymerized | 37.5 | | 1.9 | 220.2 | 232.0 | 200.3 | 31.7 |
| 5* | noncrosslinkable acryl-styrene copolymer | 38.1 | | 2.0 | 220.3 | 235.6 | 193.6 | 42.1 |
| 6 | Suspension- | 37.4 | 90.9 | 1.7 | 254.7 | 265.3 | 240.2 | 25.1 |
| 7 | polymerized | 37.1 | | 1.9 | 248.0 | 259.8 | 229.7 | 30.1 |
| 8* | noncrosslinkable polystyrene | 38.5 | | 2.1 | 224.0 | 254.1 | 199.0 | 55.1 |
| 9 | Silicone | 37.3 | 93.0 | 1.6 | 244 | 258.5 | 232 | 26.5 |
| 10 | | 37.2 | | 1.9 | 225.6 | 235 | 203 | 32 |
| 11* | | 38.4 | | 2.2 | 218.5 | 234.7 | 192.7 | 42 |

Samples marked '*' are out of the scope of the present invention.

As is apparent from the results shown in Table 1, the samples No. 1 and 2 in which the value of a cross sectional area (S1) to an area (S2) is more than 95%, since a ratio of void portions on an optional cross section in a pressure direction is a high ratio, a mean of the four-point flexural strength was 198 MPs or less, it was impossible to apply for the sliding member. Also, the samples 2, 5, 8 and 11 in which the ratio (P75/P25) of a pore size of independent pores is more than 1.9, because of a large variation in the pore sizes, a range of the four-point flexural strength was such large as 41.5 MPa and it was impossible to produce a sliding member having high reliability.

On the other hand, in the samples 3, 4, 6, 7, 9 and 10 in which the value of a cross sectional area (S1) to an area (S2) is 95% or less and the ratio (P75/P25) of cumulative distribution is 1.9 or less, because of a low ratio of void portions on an optional cross section in a pressure direction and a small variation in the pore sizes, a range of the four-point flexural strength is small such as 32 MPa or less regardless of a mean value of the four-point flexural strength of 220 MPa or more and a minimum value of the four-point flexural strength of 200 MPa or more, and thus it is possible to preferably use as the sliding member.

Example 2

In a ball mill, a silicon carbide powder, a sintering additive, a dispersing agent and water were added in each predetermined amount, followed by mixing for 48 hours to obtain a slurry. At this time, those shown in Table 2 were used as the sintering additive. To the slurry, a forming auxiliary agent was added, followed by mixing and spray drying to obtain a granulated powder having a mean particle size of 18 μm.

Next, the granulated powder was mixed with suspension-polymerized noncrosslinkable resin beads as a pore forming agent in an amount shown in Table 2 to obtain a mixed raw material. The mixed raw material was formed into a transverse test piece having a shape compliant with JIS C 2141-1992 under a pressure of 98 MPa.

The resulting green body was degreased by maintaining in a nitrogen atmosphere at 600° C. for 5 hours and then sintered by maintaining in an argon atmosphere at 1,850° C. for 3 hours to obtain samples Nos. 12 to 14. With respect to the samples Nos. 12 to 14, each disk body was produced in the same manner as in Example 1 and a value of a cross sectional area (S1) to an area (S2) of independent pores and a ratio (P75/P25) of cumulative distribution of the samples Nos. 12 to 14 were measured in the same manner as in Example 1 using the resulting disk bodies. The results are shown in Table 2. The samples Nos. 12 to 14 include independent pores having a particle size of 5 μm and the independent pore is flattened body having minor axis in a direction perpendicular to sliding surface.

Using the samples Nos. 12 to 14, a thermal shock resisting temperature was determined. Herein, the thermal shock resisting temperature was determined according to JIS C 2141-1992. The results are shown in Table 2.

TABLE 2

| Sample No. | Sintering additive | | Amount of pore forming agent (% by weight) | Value of cross sectional area (S1) to area (S2) (%) | P75/P25 | Thermal shock resisting temperature (° C.) |
|---|---|---|---|---|---|---|
| 12 | Al₂O₃ | Y₂O₃ | 13 | 93 | 1.9 | 300 |
| 13 | Al₂O₃ | Y₂O₃ | 9 | 91 | 1.9 | 340 |
| 14 | B | C | 13 | 93 | 1.9 | 260 |

As is apparent from Table 2, the sample No. 14, in which a carbon powder and a boron powder are used as the sintering additive, showed low thermal shock resisting temperature of 260° C., whereas the samples No. 12 and 13, in which an alumina powder and an yttria powder are used as the sintering additive, showed high thermal shock resisting temperature of 300° C. or higher. Consequently, the samples 12 and 13 can also be used for members which are likely to receive rapid thermal shock as a result of generation of high frictional heat.

Example 3

In a ball mill, a silicon carbide powder, an alumina powder, an yttria powder, a dispersing agent and water were added in each predetermined amount, followed by mixing for 48 hours to obtain a slurry. To the slurry, a forming auxiliary agent was added, followed by mixing and spray drying to obtain a granulated powder having a mean particle size of 18 μm.

Next, the granulated powder was mixed with 8% by weight of suspension-polymerized noncrosslinkable resin beads having a mean particle size and a maximum particle size shown in Table 3 as a pore forming agent to obtain a mixed raw material. The mixed raw material was formed into a ring-shaped green body under a pressure of 98 MPa. The green body was degreased and sintered in a reducing atmosphere to obtain samples Nos. 15 to 17. With respect to the resulting samples Nos. 15 to 17, the measurement of independent pores and a wear test were conducted.

Specifically, with respect to the pore size of independent pore, the sliding surface is mirror-finished and the surface is photographed at a magnification of 200 times by a microscope, and a range is set such that a visual field is 0.146 mm$^2$ in the photograph, and then a pore size of a maximum pore (maximum pore size) in this range was measured. The sliding surface is made to be flat surface by a flat-surface grinding machine, and next crude processing be applied thereonto by a lapping machine made of alumina by using diamond abrasive grains having a mean grain diameter of 3 μm, and thereafter, mirror-finish processing be performed thereonto by a lapping machine made of tin such that an arithmetic mean roughness Ra is from 0.62 to 1.47 μm.

With respect to the mirror-finished sliding surface, in the same manner as in Example 1, a value of a cross sectional area (S1) to an area (S2) of independent pores and a ratio (P75/P25) of cumulative distribution of the samples Nos. 15 to 17 were measured in the same manner as in Example 1 using the resulting disk bodies. The results are shown in Table 3. The samples Nos. 15 to 17 include independent pores having a particle size of 5 μm and the independent pore is a flattened body having minor axis in a direction perpendicular to sliding surface.

A wear test was conducted by the following procedure. Namely, the resulting ceramic were placed at a predetermined position of a wet type wear testing machine and an opposite material made of carbon was brought into contact with the ceramic. Using water as a lubricant, the wet type wear testing machine was operated under a surface pressure of 0.8 MPa for 24 hours and then hit flaws formed on the surface of the opposite material were observed at a magnification of 100 times by a microscope.

The measurement results of the pore size of the maximum pore and the results of the wet type wear test are shown in Table 3.

As is apparent from Table 3, in the sample No. 15 having a large maximum pore size of 150 μm, hit flaws were observed, whereas in the samples Nos. 16 and 17 each having a small maximum pore size of 100 μm or less, hit flaws were not observed. This reason is considered as follows. Namely, when the maximum pore size becomes larger, full length of edges formed by open pore and the sliding surface becomes longer and, when the opposite material is soft material such as carbon, probability in which particles chipped off from edges damage the opposite material increases.

On the other hand, when the maximum pore size becomes smaller, full length of edges formed by open pore and the sliding surface becomes longer and, even when the opposite material is soft material such as carbon, damage of the opposite material due to the edges can be prevented beforehand.

Example 4

In a ball mill, a silicon carbide powder, an alumina powder, an yttria powder, a dispersing agent and water were added in each predetermined amount, followed by mixing for 48 hours to obtain a slurry. To the slurry, a forming auxiliary agent was added, followed by mixing and spray drying to obtain a granulated powder having a mean particle size of 18 μm.

Next, the granulated powder was mixed with suspension-polymerized noncrosslinkable resin beads. In this case, 8% by weight of resin beads were added to the granulated powder to obtain samples Nos. 18 to 21, while resin beads were added in each amount shown in Table 4 to obtain samples Nos. 22 to 25.

In case of sample No. 18, the pore forming agent was mixed by placed on the granulated powder as it is. In case of samples Nos. 19 to 25, a mixed raw material was obtained by adding the pore forming agent to 25% of the granulated powder and the resulting mixed raw material and the residual granulated powder were alternately laminated, followed by mixing using a single shaft rotary mixer to obtain a powdered raw material. Also, a mixing time of each sample was varied as shown in Table 4.

The mixed raw material was formed into a ring-shaped green body under a pressure of 98 MPa. The resulting green body was degreased by maintaining in a nitrogen atmosphere at 600° C. for 5 hours and then sintered in an argon atmosphere at 1,850° C. for 3 hours. The sliding surface of the resulting ceramic was mirror-polished, and then the measurement of a standard deviation of a pore area % of open pore and a wear test was conducted.

The standard deviation of the number of pores was determined by the following procedure. Namely, the ring-shaped ceramic was mirror-polished and 10 areas measuring 1.8 mm×1.3 mm were randomly selected at intervals of 1 mm, and then the cross section was photographed at a magnifica-

TABLE 3

| Sample No. | Mean particle size of pore forming agent (μm) | Maximum particle size of pore forming agent (μm) | Maximum pore size (μm) | Value of cross sectional area (S1) to area (S2) (%) | P75/P25 | Hit flaws formed on the surface of opposite material |
|---|---|---|---|---|---|---|
| 15 | 55 | 188 | 150 | 85.3 | 1.75 | observed |
| 16 | 50 | 125 | 100 | 88.5 | 1.75 | not observed |
| 17 | 38 | 100 | 80 | 90.4 | 1.7 | not observed | tion of 50 times by a microscope. The standard deviation was determined using an image processing system.

With respect to the above mirror-polished sliding surface, in the same manner as in Example 1, a value of cross sectional area (S1) to an area (S2) of independent pores and a ratio (P75/P25) of cumulative distribution of the samples Nos. 18 to 25 were measured in the same manner as in Example 1 using the resulting disk bodies. The results are shown in Table 4. The samples Nos. 18 to 25 include independent pores having a particle size of 5 μm and the independent pore is flattened body having minor axis in a direction perpendicular to sliding surface.

A wear test was conducted by the following procedure. Namely, the resulting ceramic was placed at a predetermined position of a wet type wear testing machine and an opposite material made of a dense silicon carbide was brought into contact with the ceramic. Using water as a lubricant, the wet type wear testing machine was operated under a surface pressure of 0.8 MPa for 500 hours and then an amount of water leaked (leak amount) and the temperature of ceramic was measured. Herein, the amount of water leaked (leak amount) was employed as an indicator which shows sealing performance of sealing, while the temperature of ceramic was employed as an indicator which shows temperature rise due to frictional heat, namely, sliding stability. The temperature was measured by the following procedure. Namely, a probe for measuring the temperature was attached to the opposite material and the value was plotted every 1 hour. The results are shown in Table 4.

mixed by placed on the granulated powder as it is in case of the sample No. 26. In case of the samples Nos. 27 to 29, a mixed raw material was obtained by adding 8% by weight of the pore forming agent to 25% of the granulated powder and the resulting mixed raw material and the residual granulated powder were alternately laminated, followed by mixing using a single shaft rotary mixer to obtain a powdered raw material. A mixing time of each sample was varied as shown in Table 5. The particle size of the pore forming agent used in the sample No. 27 was preliminarily adjusted using a sieve, thereby controlling the proportion of the pore forming agent having a particle size of 100 μm or more to 10%.

The mixed raw material was formed into a ring-shaped green body under a pressure of 98 MPa. The resulting green body was degreased by maintaining in a nitrogen atmosphere at 600° C. for 5 hours and then sintered in an argon atmosphere at 1,850° C. for 3 hours, and then the measurement of a standard deviation of the number of pores of the resulting ceramic and a wear test was conducted.

The standard deviation of the number of pores was determined by the following procedure. Namely, the ring-shaped ceramic was mirror-polished and 10 areas measuring 1.8 mm×1.3 mm were randomly, selected at intervals of 1 mm, and then the cross section was photographed at a magnification of 50 times by a microscope. The standard deviation was determined using an image processing system. In this case, the total of the number of pores in these regions was in a range from 220 to 330.

TABLE 4

| Sample No. | Mixing time of pore forming agent (min) | Amount of pore forming agent (% by weight) | Porosity (%) | Standard deviation of pore area ratio (%) | Value of cross sectional area (S1) to area (S2) (%) | P75/P25 | Leak amount (ml/hr) | Maximum temperature (° C.) |
| --- | --- | --- | --- | --- | --- | --- | --- | --- |
| 18 | 1.0 | 8.0 | 14.1 | 3.7 | 91.0 | 1.7 | 0.15 | 45 |
| 19 | 3.5 | 8.0 | 14.1 | 2.0 | 91.0 | 1.8 | 0.02 | 42 |
| 20 | 4.0 | 8.0 | 13.9 | 1.9 | 91.0 | 1.75 | 0.01 | 39 |
| 21 | 5.0 | 8.0 | 14.0 | 1.4 | 91.0 | 1.7 | 0.004 | 38 |
| 22 | 5.0 | 1.0 | 3.0 | 1.1 | 89.0 | 1.75 | 0.001 | 59 |
| 23 | 5.0 | 3.0 | 6.0 | 1.7 | 90.4 | 1.75 | 0.02 | 38 |
| 24 | 5.0 | 11.5 | 18.5 | 2.0 | 93.0 | 1.75 | 0.3 | 37 |
| 25 | 5.0 | 11.0 | 18.0 | 1.7 | 92.0 | 1.75 | 0.005 | 37 |

As is apparent from the results shown in Table 4, samples Nos. 19 to 21, 23 and 25, in which the standard deviation of the pore area % is such small as 2% or less, showed less liquid leakage and low maximum temperature during a test.

From the above results, it has been found that, when the standard deviation of the pore area % is small, namely, dispersion of pores is excellent and the surface roughness is lowered, through holes do not exist and sealing performance is enhanced and thus a torque during sliding operation becomes stable even if ceramic have a large porosity.

Example 5

In a ball mill, a silicon carbide powder, an alumina powder, an yttria powder, a dispersing agent and water were added in each predetermined amount, followed by mixing for 48 hours to obtain a slurry. To the slurry, a forming auxiliary agent was added, followed by mixing and spray drying to obtain a granulated powder having a mean particle size of 18 μm.

The granulated powder was mixed with 8% by weight of suspension-polymerized noncrosslinkable resin beads as a pore forming agent. In this case, the pore forming agent was A wear test was conducted by the following procedure. Namely, the resulting ceramic was placed at a predetermined position of a wet type wear testing machine and an opposite material made of a dense silicon carbide was brought into contact with the ceramic. Using water as a lubricant, the wet type wear testing machine was operated under a surface pressure of 0.8 MPa for 500 hours and then an amount of wear of carbon after the test was measured. The results are shown in Table 5.

With respect to the samples Nos. 26 to 29, each disk body was produced in the same manner as in Example 1 and a value of a cross sectional area (S1) to an area (S2) of independent pores and a ratio (P75/P25) of cumulative distribution of the samples Nos. 26 to 29 were measured in the same manner as in Example 1 using the resulting disk bodies. The results are shown in Table 5. The samples Nos. 26 to 29 include independent pores having a particle size of 5 μm and the independent pore is flattened body having minor axis in a direction perpendicular to sliding surface.

TABLE 5

| Sample No. | Mixing time of pore forming agent (min) | Standard deviation of number of pores | Proportion of pores having a pore size of 80 μm or more (%) | Value of cross sectional area (S1) to area (S2) (%) | P75/P25 | Wear amount (μm) |
|---|---|---|---|---|---|---|
| 26 | 1 | 72 | 5 | 93 | 1.90 | 13 |
| 27 | 3 | 54 | 8 | 92.5 | 1.80 | 10 |
| 28 | 3 | 55 | 5 | 91 | 1.70 | 8 |
| 29 | 5 | 39 | 3 | 90 | 1.75 | 5 |

As is apparent from the results shown in Table 5, in case of the sample Nos. 28 and 29, in which the standard deviation of the number of pores is 55 or less and the proportion of pores having a pore size of 80 μm or more is 5% or less, showed a small wear amount of a carbon material. This reason is considered that an origin capable of accelerating wear does not exist because of good dispersion state of pores.

Example 6

In a ball mill, a silicon carbide powder, a sintering additive, water and a dispersing agent were added, followed by mixing for 48 hours to obtain a slurry. At this time, those in which a boron powder and a carbon powder are used as a sintering additive, or those in which an alumina powder and an yttria powder are used as a sintering additive are separately prepared. To the slurry, a forming auxiliary agent was added, followed by mixing and spray drying to obtain a granulated powder having a mean particle size of 18 μm.

Next, the granulated powder was mixed with 8% by weight of suspension-polymerized noncrosslinkable resin beads as a pore forming agent to obtain a mixed raw material. The mixed raw material was formed into 15 green bodies each having a predetermined shape under a pressure of 98 MPa. The resulting green bodies were degreased by maintaining in a nitrogen atmosphere at 600° C. for 5 hours and then sintered in an argon atmosphere at 2,050° C. for 3 hours in case of using a boron powder and a carbon powder, or sintered in an argon atmosphere at 1,850° C. for 3 hours in case of using an alumina powder and an yttria powder to obtain the samples Nos. 30 and 31.

With respect to the samples Nos. 30 and 31, each disk body was produced in the same manner as in Example 1 and a value of a cross sectional area (S1) to an area (S2) of independent pores and a ratio (P75/P25) of cumulative distribution of the samples Nos. 30 and 31 were measured in the same manner as in Example 1 using the resulting disk body. As a result, the sample No. 30 showed a value of a cross sectional area (S1) to an area (S2) of 92 and a ratio (P75/P25) of cumulative distribution of 1.85. The sample No. 31 showed a value of a cross sectional area (S1) to area (S2) of 91 and a ratio (P75/P25) of cumulative distribution of 1.7. The samples Nos. 30 and 31 include independent pores having a particle size of 5 μm or more and the independent pore is flattened body having minor axis in a direction perpendicular to sliding surface.

5 ceramics among the resulting ceramics were used to measure a free carbon amount on the surface, namely in open pore. Free carbon was determined by the following procedure. Namely, ceramics were finely ground and burned in an oxygen atmosphere at 900° C., and then an amount of carbon dioxide generated was measured using gas chromatograph. As a result, in case of the sample No. 30 in which the sintering additive is composed of a boron powder and a carbon powder, the presence of free carbon was recognized, whereas in case of the sample No. 31 in which the sintering additive is composed of an alumina powder and an yttria powder, the presence of free carbon was not recognized. The pore size of open pore of the samples Nos. 30 and 31 was measured at the same time of the measurement of the independent pores. As a result, it was 100 μm or less in both samples.

With respect to the remaining samples Nos. 30-1 to 30-10 and 31-1 to 31-10, a wear test was conducted by the following procedure. Namely, the samples were placed at a predetermined position of a wet type wear testing machine and an opposite material made of a dense silicon carbide was brought into contact with the ceramic. Using water as a lubricant, the wet type wear testing machine was operated under a surface pressure of 5 MPa for 0.5 hours and then it was confirmed whether or not abnormal noise called "cry" occur. The results are shown in Table 6.

TABLE 6

| Sample No. | Cry |
|---|---|
| 30-1 | not occurred |
| 30-2 | not occurred |
| 30-3 | not occurred |
| 30-4 | not occurred |
| 30-5 | not occurred |
| 30-6 | not occurred |
| 30-7 | not occurred |
| 30-8 | not occurred |
| 30-9 | not occurred |
| 30-10 | not occurred |
| 31-1 | not occurred |
| 31-2 | occurred |
| 31-3 | not occurred |
| 31-4 | not occurred |
| 31-5 | not occurred |
| 31-6 | not occurred |
| 31-7 | not occurred |
| 31-8 | not occurred |
| 31-9 | occurred |
| 31-10 | not occurred |

Regarding the occurrence of abnormal noise called "cry" which has been considered to a problem in case of sliding between dense silicon carbides, since a lubricant is stably supplied between sliding surface by making the silicon carbide to be porous, a state of fluid lubrication is maintained. Particularly, in the sample No. 30 in which a boron powder and a carbon powder were used as a sintering additive, "cry" was not confirmed as a result of a wear test. However, in the sample No. 31 in which an alumina powder and an yttria powder were used as a sintering additive, "cry" was confirmed, although cry occurs less frequently.

Consequently, it has been found that it is effective to include free carbon in pores so as to further reduce "cry" occurred at the time of sliding between hard materials.

The invention claimed is:

1. A porous ceramic for a slide member comprising:
a plurality of independent pores having a pore size of 5 μm or more, wherein at least one of the independent pores is a flattened body having a minor axis in a direction perpendicular to a sliding surface, and the at least one independent pores has a cross sectional area (S1) at a cross section perpendicular to the sliding surface is 95% or less of an area (S2) of a complete round having a diameter which is the same length as a major axis of the cross section of the independent pores, and wherein, in a cumulative distribution curve of pore sizes of independent pores in a plane parallel to the sliding surface, a ratio (P75/P25) of a pore size of cumulative 75% by volume (P75) to a pore size of cumulative 25% by volume (P25) is 1.9 or less.

2. The porous ceramic for a slide member according to claim 1, wherein a four-point flexural strength the porous ceramic is 200 MPa or more.

3. The porous ceramic for a slide member according to claim 1, wherein a thermal shock resisting temperature of the porous ceramic is 300° C. or higher.

4. The porous ceramic for a slide member according to claim 1, wherein more than one of the independent pores are open pores on the sliding surface, and a pore size of the open pores is 100 μm or less.

5. The porous ceramic for a slide member according to claim 4, wherein free carbon is in the open pore.

6. The porous ceramic for a slide member according to claim 1, wherein a porosity in 10 areas measuring 1.8 mm×1.3 mm randomly selected at intervals of 1 mm on the sliding surface is from 6 to 18%, and a standard deviation in a pore area ratio of the open pore formed on the sliding surface is 2% or less.

7. The porous ceramic for a slide member according to claim 6, wherein a sum total of numbers of pores in the 10 areas is from 220 to 330, and a standard deviation therein is 55 or less.

8. The porous ceramic for a slide member according to claim 6, wherein a number of pores having a pore size of 80 μm or more in the 10 areas is 5% or less of the total number of pores.

9. The porous ceramic for a slide member according to claim 1, further comprising silicon carbide ceramic.

10. The porous ceramic for a slide member according to claim 1, wherein a maximum pore size of the at least one independent pore is 120 μm or less.

11. A method for preparing the porous ceramic for slide member according to claim 1, comprising the steps of:
mixing spherical resin beads serving as a pore forming agent and a granulated powder with agitating to obtain a mixed raw material,
pressure-forming the mixed raw material, thereby plastically deforming the pore forming agent in a pressure direction to obtain a green body having a desired shape, and
sintering the green body with heating to obtain ceramic.

12. A method for preparing the porous ceramic for slide member according to claim 1, comprising the steps of:
mixing spherical resin beads serving as a pore forming agent and a granulated powder with agitating to obtain a mixed raw material,
alternately charging the mixed raw material and another granulated powder into a container to obtain a powder raw material using a single shaft rotary mixer,
pressure-forming the mixed raw material, thereby plastically deforming the pore forming agent in a pressure direction to obtain a green body having a desired shape, and
sintering the green body with heating to obtain ceramic.

13. The method for preparing the porous ceramic for slide member according to claim 11 or 12, wherein the resin beads are at least one kind selected from resin beads formed of silicone, resin beads formed of polystyrene, and resin beads formed of acrylic-styrene copolymer, and are suspension-polymerized noncrosslinkable resin beads.

14. The method for preparing the porous ceramic for slide member according to claim 11 or 12, wherein at least one kind selected from a carbon powder, a boron powder, an alumina powder, and an yttria powder is used as a sintering additive.

15. A mechanical seal ring comprising the porous ceramic for a slide member according to claim 1.

* * * * *